United States Patent
Stevenson et al.

(10) Patent No.: US 9,606,526 B2
(45) Date of Patent: Mar. 28, 2017

(54) INTELLIGENT CONSTRAINT SELECTION FOR POSITIONING TASKS

(71) Applicant: Siemens Product Lifecycle Management Software Inc., Plano, TX (US)

(72) Inventors: Matthew Stevenson, Suffolk (GB); Dick Baardse, Geldermalsen (NL); Austin Benson, Cambridge (GB)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 302 days.

(21) Appl. No.: 14/289,337

(22) Filed: May 28, 2014

(65) Prior Publication Data

US 2015/0346711 A1    Dec. 3, 2015

(51) Int. Cl.
*G06F 19/00* (2011.01)
*G05B 19/402* (2006.01)
(Continued)

(52) U.S. Cl.
CPC ..... *G05B 19/402* (2013.01); *G06F 17/30554* (2013.01); *G06F 17/50* (2013.01);
(Continued)

(58) Field of Classification Search
CPC ........ G05B 19/402; G05B 2219/37618; G05B 2219/49001; G06F 17/30554; G06F 17/50;
(Continued)

(56) References Cited

U.S. PATENT DOCUMENTS

| 5,008,853 A * | 4/1991 | Bly .................. G06F 17/30171 345/2.1 |
| 5,410,496 A | 4/1995 | Bolon et al. |

(Continued)

FOREIGN PATENT DOCUMENTS

WO     2013183485 A1    12/2013

OTHER PUBLICATIONS

Foreign Communication From a Related Counterpart Application, PCT Application No. PCT/US2015/031656, International Search Report and Written Opinion, dated Aug. 17, 2015, 10 pages.

*Primary Examiner* — Kenneth M Lo
*Assistant Examiner* — Yuhui R Pan

(57) ABSTRACT

A method for editing a position of a selected design element in a constraint network. The method includes receiving the selected design element in a geometric model from a user, searching a database for a positioning group related to the selected design element, and adding the selected design element and the positioning group related to the selected design element into a work collection. The method then includes searching the database a second time for reference positioning groups and reference design elements referenced by constraints of the positioning group and design elements in the work collection and adding the reference positioning groups and the reference design elements discovered by the second searching into a context collection. The method then further includes loading all the constraints for the positioning groups and the design elements which were added to the work collection.

20 Claims, 3 Drawing Sheets

(51) Int. Cl.
  *G06F 17/30* (2006.01)
  *G06T 17/10* (2006.01)
  *G06T 19/20* (2011.01)
  *H04L 12/927* (2013.01)
  *G06F 17/50* (2006.01)

(52) U.S. Cl.
  CPC .............. *G06T 17/10* (2013.01); *G06T 19/20*
      (2013.01); *H04L 47/808* (2013.01); *G05B*
      *2219/37618* (2013.01); *G05B 2219/49001*
      (2013.01); *G06T 2219/024* (2013.01); *G06T*
      *2219/2004* (2013.01)

(58) Field of Classification Search
  CPC ... G06T 17/10; G06T 19/20; G06T 2219/024;
      G06T 2219/2004; H04L 47/808
  USPC ........................................................ 700/114
  See application file for complete search history.

(56) References Cited

U.S. PATENT DOCUMENTS

| | | | |
|---|---|---|---|
| 5,617,510 A | 4/1997 | Keyrouz et al. | |
| 6,002,854 A | 12/1999 | Lynch et al. | |
| 6,441,837 B1 | 8/2002 | Harding et al. | |
| 6,604,068 B1 | 8/2003 | Bukowski et al. | |
| 6,718,218 B1 | 4/2004 | Matheson | |
| 6,898,560 B1 * | 5/2005 | Das .......................... | G06T 17/10 703/22 |
| 7,103,434 B2 | 9/2006 | Chernyak et al. | |
| 7,176,942 B2 | 2/2007 | Chartier et al. | |
| 7,623,139 B1 | 11/2009 | Gifford et al. | |
| 7,663,625 B2 | 2/2010 | Chartier et al. | |
| 7,755,623 B2 | 7/2010 | Rockwood et al. | |
| 8,035,638 B2 | 10/2011 | Pelletier-Doyle et al. | |
| 8,473,259 B2 | 6/2013 | Diguet et al. | |
| 8,490,000 B2 | 7/2013 | Okuwaki et al. | |
| 8,554,521 B2 | 10/2013 | Diguet et al. | |
| 8,566,066 B2 | 10/2013 | Thompson et al. | |
| 8,589,128 B2 | 11/2013 | Buchowski et al. | |
| 8,645,107 B2 | 2/2014 | Gibson et al. | |
| 2003/0156127 A1 | 8/2003 | Kleyman | |
| 2009/0259442 A1 | 10/2009 | Gandikota et al. | |
| 2011/0270586 A1 | 11/2011 | Diguet et al. | |
| 2012/0004891 A1 | 1/2012 | Rameau et al. | |
| 2012/0317497 A1 * | 12/2012 | Red .......................... | G06F 17/50 715/751 |
| 2013/0151206 A1 | 6/2013 | Kripac et al. | |
| 2013/0188877 A1 | 7/2013 | Gulwani et al. | |
| 2014/0025349 A1 | 1/2014 | Diguet et al. | |
| 2014/0032182 A1 | 1/2014 | Diguet et al. | |

* cited by examiner

INTELLIGENT CONSTRAINT SELECTION FOR POSITIONING TASKS

CROSS-REFERENCE TO OTHER APPLICATION

This application shares some subject matter with commonly-assigned, concurrently filed U.S. patent application Ser. No. 14/289,380 for "Method for Creation and Editing of a Massive Constraint Network", now published as U.S. Patent Application Publication US 2015-0347567, which is hereby incorporated by reference.

TECHNICAL FIELD

The present disclosure is directed, in general, to computer-aided design ("CAD"), visualization, and manufacturing systems, product lifecycle management ("PLM") systems, and similar systems, that manage data for products and other items (collectively, "Product Data Management" systems or PDM systems).

BACKGROUND OF THE DISCLOSURE

PDM systems manage PLM and other data. Improved systems are desirable.

SUMMARY OF THE DISCLOSURE

Disclosed embodiments include a method for editing a position of a selected design element in a constraint network. The method includes receiving the selected design element in a geometric model from a user, searching a database for a positioning group related to the selected design element, and adding the selected design element and the positioning group related to the selected design element into a work collection. The method then includes searching the database a second time for reference positioning groups and reference design elements referenced by constraints of the positioning group and design elements in the work collection and adding the reference positioning groups and the reference design elements discovered by the second searching into a context collection. The method then further includes loading all the constraints for the positioning groups and the design elements which were added to the work collection.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
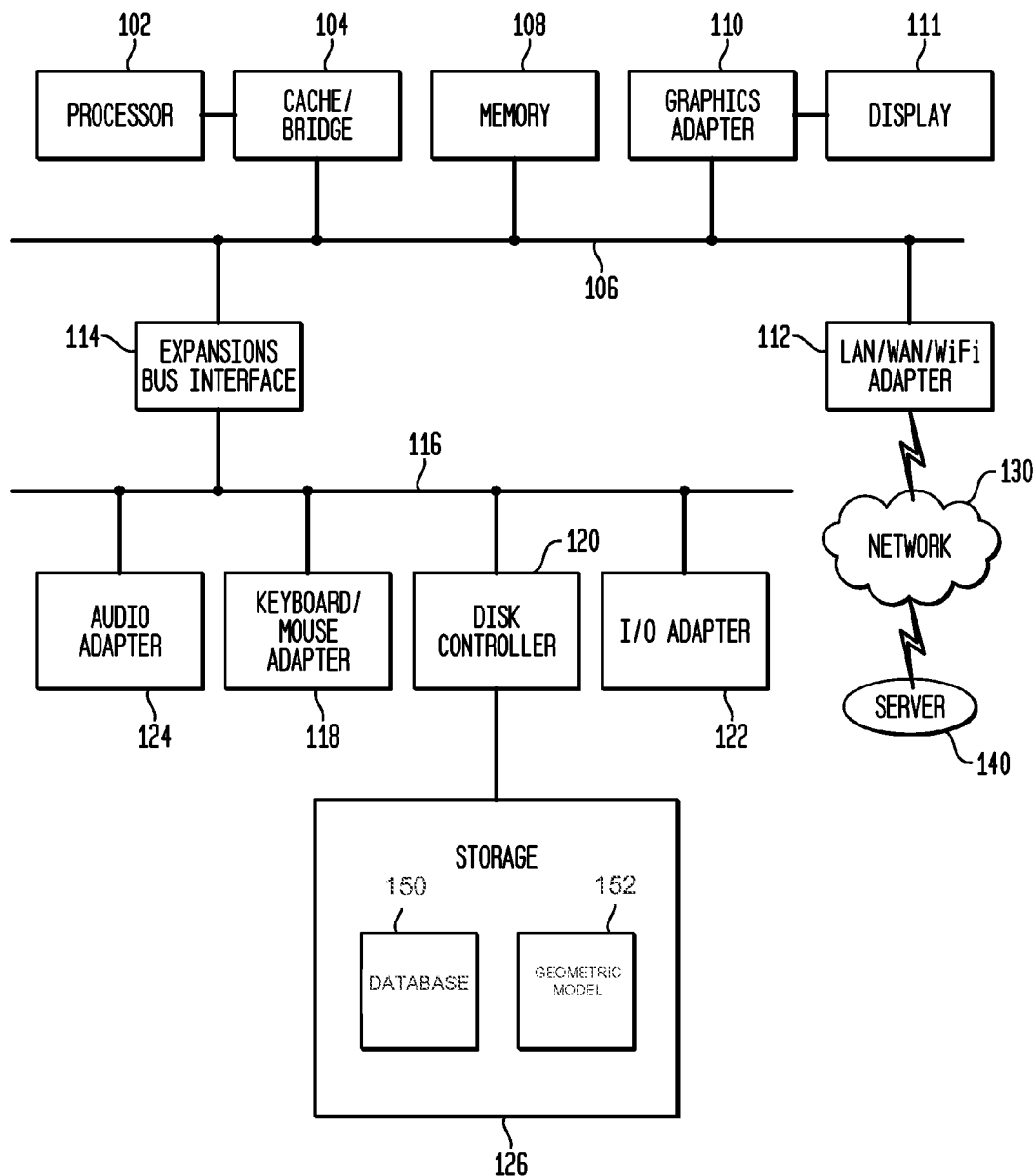
FIG. 1 depicts a block diagram of a data processing system in which an embodiment can be implemented.
Figures 2, 3:
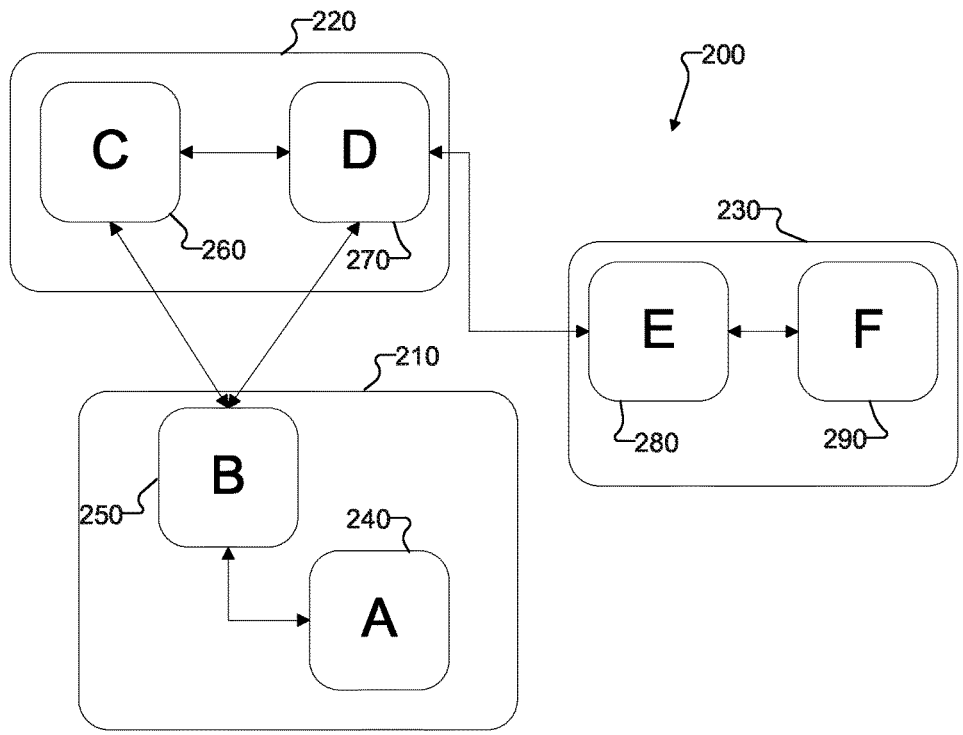
FIG. 2 illustrates position groups in a constraint network in accordance with the present disclosure.
FIG. 3 illustrates a positioning task implemented in a navigator window in accordance with the present disclosure.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Millions of parts could be constrained in a single constraint network in a product, increasing the amount of memory required to load the model and restricting suitable hardware. To increase work productivity and efficiency, disclosed embodiments automatically break up the constraint network into smaller pieces without interaction from the user. The smaller pieces allow users to only download the design element or elements that the user is currently editing, so that less memory is required. Having the user only download the positioning tasks needed for specific design elements also allows multiple users to edit a single assembly or subassembly without locking each other out of or overwriting each other's work.

FIG. 1 depicts a block diagram of a data processing system in which an embodiment can be implemented, for example, as a PDM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices. The storage 126 stores the database 150, the geometric model 152, and so on, which are described below.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Disclosed embodiments provide systems and methods that manage constraints between design elements in a PDM system.

FIG. 2 illustrates position groups in a constraint network 200 in accordance with the disclosed embodiments. A positioning group 210, also known as a geometric constraint collection, is composed of a group of design elements (240, 250), also known as foreground design elements, and the sets of positioning constraints that define the positions of the design elements (240, 250) in the positioning group 210. The positioning group 210 also contains references to the design elements (260, 270), also known as background design elements, or positioning groups 220 that are outside the positioning group 210 but are needed for the sets of positioning constraints contained within the positioning group 210. In certain embodiments, additional design elements (280, 290) or additional positioning groups 230 are needed for positioning of design elements.

In one embodiment, a design element or a constraint is in the foreground of only one positioning group 210. In another embodiment, design elements and positioning constraints may be contained in multiple positioning groups 210. In certain embodiments, some design elements may not be included in any positioning group 210.

FIG. 3 illustrates a positioning task 310 implemented in a navigator window 300 that can be generated by a data processing system 100 using techniques disclosed within. The positioning task 310 organizes and protects the data that a user needs to perform a task. The positioning task 310 separates objects that are needed to perform the work from other objects that might be loaded in a CAD session. The positioning task 310 is used for defining positions of design elements and positioning groups 210. Design elements can be any type of object including parts, subassemblies, assemblies, and sketches.

When creating assembly constraints some design elements are allowed to move, while others can be referenced but cannot be modified. The positioning task 310 splits a large collection of visible and loaded objects into smaller collections comprised into a work collection 330 and a context collection 340. Objects added to the work collection 330 are allowed to be modified during the task, whereas objects added to the context collection 340 are not modifiable and are only referenced by the work collection 330 during the task. If a user desires to modify an object existing in the context collection, the object must first be moved or added into the work collection. The process of moving an object to the work collection can be performed automatically by the system or manually by the user. The remainder of the objects are loaded and displayed as part of the environment, but are not modified or referenced during the task.

A task definition defines which positioning groups 210 or design elements are found in the work collections and context collections of a positioning task 310. A task definition can be stored and reused later for reviewing or checking. The task can also be shared with other users. A user has the ability to define a task for another user.

The work collection 330 and the context collection 340 can be defined and modified by the user. A navigator window 300 is used to display the work collection 330 and the context collection 340.

The collections can be defined manually by the user or automatically by the system. Design elements can be added to the work collection 330 or context collection 340 based on ownership of the design element, access rights to the design element, properties on the design element, actions between design elements, relationships between design elements, user specific action, or other suitable methods of adding design elements.

When objects are added or removed from a collection, predefined rules or actions can be executed. These rules can provide the user with information. A possible action on adding a selected design element 250 to the work collection 330 would be to load a reference design element (240, 260, 270) that constrains the selected design element 350 and add the reference design element (240, 260, 270) to the context collection 340.

In certain embodiments, the design elements that a user is working on may have access rights. Not every user is allowed to modify every design element. A positioning task 310 allows the user to specify beforehand which design elements are allowed and expected to be modified while solving a problem. The collections are used to limit selection in certain functions. This prevents the user from finding solutions he will be unable to store later. Design elements that are in the environment or context collection 340 cannot be modified by accident.

In certain embodiments, the design elements that the user works with are often interrelated. The positioning task 310 can be used to add related design elements 360 to the context collection 340 in order to ensure that the relations between the work design elements and other design elements are maintained. The positioning task 310 contains a mechanism to identify design elements in the database 150 that are related to design elements 350 that are added to the work collection 330. The related design elements are automatically searched for and found in the database 150. The design elements 360 are added to the context collection 340 in the positioning task 310 when they are needed.

The positioning task 310 can contain sub-positioning tasks. The sub-positioning task only contains a work collection. The context collection for the sub-positioning is the work collection 330 and context collection 340 of the higher task level.

Existing functions in the application can be made task-aware. Task-aware could mean that selections can be filtered based on collection membership. Task-aware could also mean that newly created objects are added to the work collection 330, or that additional related data is loaded when a function is executed. Such task-aware functions could be assembly constraints 320, move component, or create a new design element.

The positioning task 310 is implemented in both manual and automatic workflow. In the manual workflow the collections are static and explicitly defined by the user. In the automatic workflow some task-aware functions can cause design elements to become members of a collection because they will modify the geometry, allowing users to not have to define the groups ahead of time. When the positioning task 310 is defined automatically, the checking for access rights and loading of related design elements will still occur.

Figure 4:
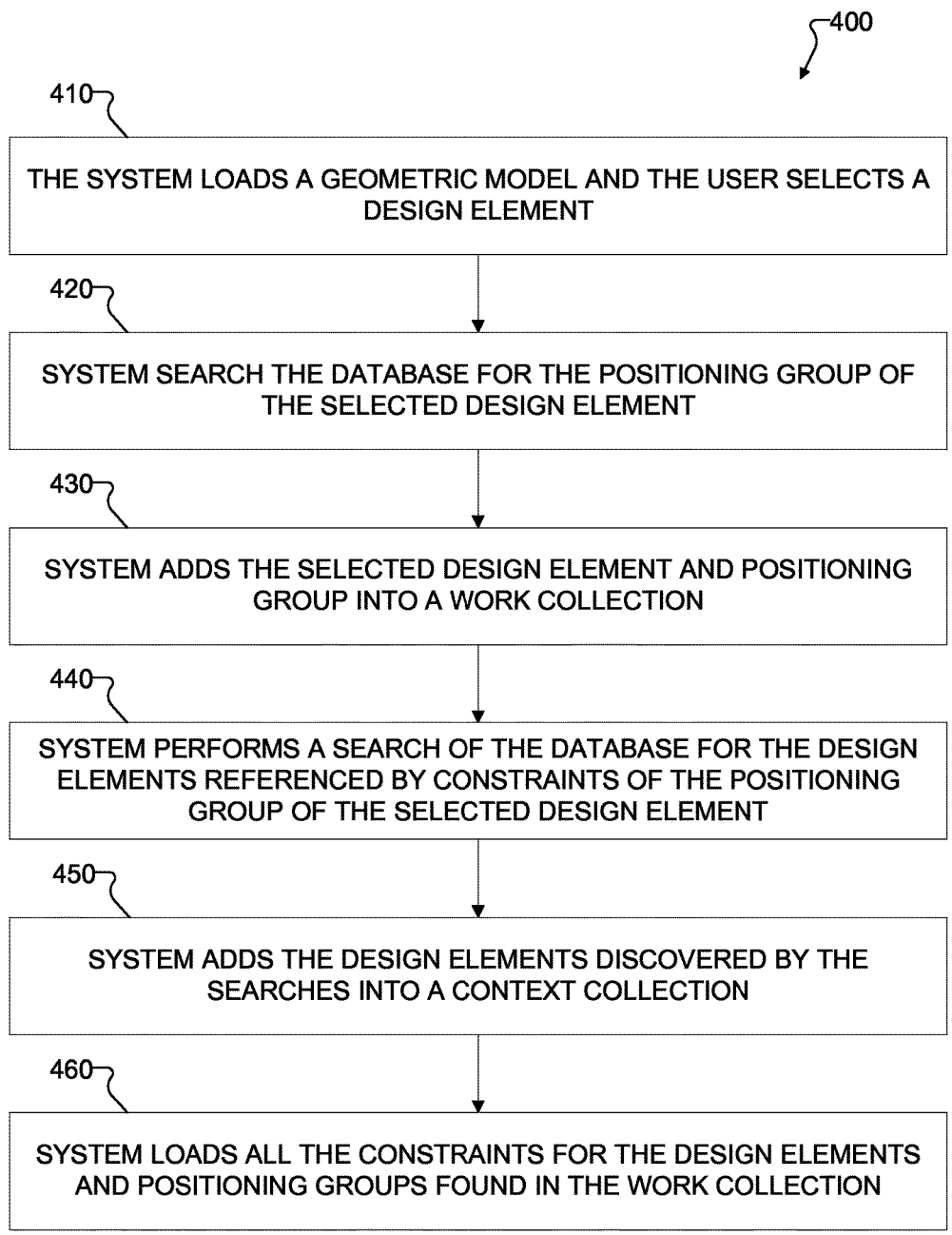
FIG. 4 illustrates editing a geometric model using a positioning task method in accordance with the present disclosure.

FIG. 4 illustrates editing a geometric model 152 using a positioning task method 400, in accordance with disclosed embodiments, that can be performed, for example, by one or more data processing systems as described herein.

In step 410, the system loads a model and receives a user selection of a design element for the purpose of modifying the position of the design element. The system then receives the selection of the design element 250 in the geometric model 152 from the user.

In certain embodiments, the system checks the access rights to the selected design element 250. If the user does not have access rights to the selected design element 250, the system will stop the positioning task method, notify the user of insufficient access rights, and not load the selected design element 250 in the geometric model 152. In other embodiments, the system will allow the user to select a different design element desired to be edited.

In step 420, the system searches the database 150 for the positioning group 210 related to the selected design element 250. Once the positioning group 210 is found, the system loads the positioning group 210 and puts the data into session. The positioning group 210 can be made of constraints, design elements, or any other positioning data. A positioning group 210 consists of foreground and background members. Foreground members are active design elements included in the positioning data and background members are design elements that are referenced by constraints of the foreground members. The foreground and background members' indication of the design elements will not be visible to the user.

In certain embodiments, the system checks the user has access rights to the positioning group 210 of the selected design element. If the user has the access rights, the system loads positioning group 210 into the system. If the user does not have the access rights to the positioning group 210, the system will not load the positioning group 210. The system could further display a message indicating that the user does not have the correct user access rights for the positioning group 210.

In step 430, the system adds the selected design element 250 and positioning group 210 related to the selected design element 250 into a work collection 330.

In step 440, the system performs a second search of the database 150 for referenced positioning groups 210 and referenced design elements (260, 270) that are referenced by constraints of the positioning group 210 of the selected design element 250 in the work collection 330. As a result of the search, many more constraints, design elements, and positioning groups can be added to the session. Any positioning group 220 that references the selected design element 250 is added into the session.

In step 450, the system adds all the referenced positioning groups 220 and the referenced design elements (260, 270) discovered by the second search into a context collection 340. The context collection 340 contains all the design elements that are required for the selected design element 250 to be modified. The design elements 360 in the context collection 340 are not modifiable. Because the design elements 360 in the context collection 340 are not modifiable, the system does not need to check the user access rights. Yet in certain embodiments, the design elements 360 in the context collection 340 are also checked for user access rights.

To ensure all the required elements for the task are added to the context collection 340, a user defined group can be defined. A user defined group can be used to group design elements of a subassembly or some other functional group.

In step 460, the system loads the constraints for the positioning group 210 and the design element 350 which were added to the work collection into the session. The constraints can be any functional relationship between two design elements including mating geometries, aligning geometries, parallel geometries, perpendicular geometries, coincident geometries, concentric geometries, tangent geometries, distance between geometries, angle between geometries, or any other positioning constraint.

When the user desires to move the selected design element 250 and discovers that referenced design elements (260, 270) require repositioning, the user can move the positioning groups 220 or design elements (260, 270) for the required positioning constraints into the work collection 330.

Once more positioning groups 220 or design elements (260, 270) are added to the work collection 330, the system performs an additional search of the database 150 for other referenced positioning group 230 and referenced design elements (280, 290) referenced by the constraints of the additional positioning groups 220 and the additional design elements (260, 270) added to the work collection. The system then adds the other referenced positioning groups 230 and the other referenced design elements (280, 290) discovered by the additional searching into the context collection 340. The system then loads all the constraints for the additional positioning groups 210 and the additional design elements which were added to the work collection. A new search is performed every time a design element or positioning group is added or moved to the work collection 330.

In certain embodiments, the positioning groups 220 and design elements (260, 270) to be added to the work collection 330 are checked for user access rights. The system will not add the design elements (260, 270) or positioning groups 220 which the user does not have access rights to and will notify the user of the lack of access rights to the design element (260, 270) or positioning group 220.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for editing a position of a selected design element in a constraint network using a positioning task comprising:
    receiving a selected design element in a geometric model from a user;
    searching a database for positioning constraints and other design elements corresponding to positioning constraints of the selected design element;
    adding the selected design element, the other design elements, and the positioning constraints into a work collection of the positioning task, wherein the positioning constraints and the design elements found in the work collection can be modified;
    searching the database a second time for reference constraints and reference design elements corresponding to constraints of the other design elements in the work collection;
    adding the reference positioning constraints and the reference design elements discovered by the second searching into a context collection of the positioning task, wherein the reference positioning constraints and the reference design elements found in the context collection cannot be modified, and the reference positioning constraints and the reference design elements in the context collection are referenced by the work collection during the positioning task;
    loading the positioning constraints, the other design elements, and the selected design element that were added to the work collection of the positioning task; and
    modifying the selected design element, the other design elements, or the positioning constraints that were added to the work collection during the positioning task.

2. The method for editing a position of a selected design element of claim 1, further comprising:
    receiving additional positioning constraints or additional design elements to be added to the work collection from the user;
    searching the database an additional time for other reference positioning constraints and other reference design elements corresponding to the constraints of the additional design elements added to the work collection of the positioning task;
    adding the other reference positioning constraints and the other reference design elements discovered by the additional searching into the context collection of the positioning task; and
    loading all the constraints for the additional positioning constraints and the additional design elements that were added to the work collection of the positioning task.

3. The method for editing a position of a selected design element of claim 1, wherein the other design elements include foreground design elements and background design elements.

4. The method for editing a position of a selected design element of claim 3, wherein a designation of foreground design elements and background design elements is not visible to the user.

5. The method for editing a position of a selected design element of claim 1, wherein the design elements have user access rights.

6. The method for editing a position of a selected design element of claim 5, further comprising:
    searching the database for the selected design element to determine whether the user has access rights to edit the selected design element.

7. The method for editing a position of a selected design element of claim 6, further comprising:
  when the user does not have access rights to the selected design element, the system notifies the user of insufficient access and the method terminates.

8. A data processing system comprising:
  a processor; and
  an accessible memory, the data processing system particularly configured to receive a selected design element in a geometric model from a user;
    search a database for positioning constraints and other design elements corresponding to positioning constraints of the selected design element;
    add the selected design element, the other design elements, and the positioning constraints into a work collection of a positioning task, wherein the positioning constraints and the design elements found in the work collection can be modified;
    search the database a second time for reference constraints and reference design elements corresponding to constraints of the other design elements in the work collection;
    add the reference positioning constraints and the reference design elements discovered by the second searching into a context collection of the positioning task, wherein the reference positioning constraints and the reference design elements found in the context collection cannot be modified, and the reference positioning constraints and the reference design elements in the context collection are referenced by the work collection during the positioning task;
    load the positioning constraints, the other design elements, and the selected design element that were added to the work collection of the positioning task; and
    modify the selected design element, the other design elements, or the positioning constraints that were added to the work collection during the positioning task.

9. The data processing system of claim 8, wherein the data processing system is further configured to:
  receive additional positioning constraints or additional design elements to be added to the work collection from the user;
  search the database an additional time for other reference positioning constraints and other reference design elements corresponding to the constraints of the additional design elements added to the work collection of the positioning task;
  add the other reference positioning constraints and the other reference design elements discovered by the additional searching into the context collection of the positioning task; and
  load all the constraints for the additional positioning constraints and the additional design elements that were added to the work collection of the positioning task.

10. The data processing system of claim 8, wherein the other design elements include foreground design elements and background design elements.

11. The data processing system of claim 10, wherein a designation of foreground design elements and background design elements is not visible to the user.

12. The data processing system of claim 8, wherein the design elements have user access rights.

13. The data processing system of claim 12, further comprising:
  search the database for the selected design element to determine whether the user has access rights to edit the selected design element.

14. The data processing system of claim 13, further comprising:
  when the user does not have access rights to the selected design element, the system notifies the user of insufficient access.

15. A non-transitory computer-readable medium encoded with executable instructions that, when executed, cause one or more data processing systems to:
  receive a selected design element in a geometric model from a user;
  search a database for positioning constraints and other design elements corresponding to positioning constraints of the selected design element;
  add the selected design element, the other design elements, and the positioning constraints into a work collection of a positioning task, wherein the positioning constraints and the design elements found in the work collection can be modified;
  search the database a second time for reference constraints and reference design elements corresponding to constraints of the other design elements in the work collection of the positioning task;
  add the reference positioning constraints and the reference design elements discovered by the second searching into a context collection of the positioning task, wherein the reference positioning constraints and the reference design elements found in the context collection cannot be modified, and the reference positioning constraints and the reference design elements in the context collection are referenced by the work collection during the positioning task;
  load the positioning constraints, the other design elements, and the selected design element that were added to the work collection of the positioning task; and
  modify the selected design element, the other design elements, or the positioning constraints that were added to the work collection during the positioning task.

16. The non-transitory computer-readable medium of claim 15, further comprising:
  receive additional positioning constraints or additional design elements to be added to the work collection from the user;
  search the database an additional time for other reference positioning constraints and other reference design elements corresponding to the constraints of the additional design elements added to the work collection of the positioning task;
  add the other reference positioning constraints and the other reference design elements discovered by the additional searching into the context collection of the positioning task; and
  load all the constraints for the additional positioning constraints and the additional design elements that were added to the work collection of the positioning task.

17. The non-transitory computer-readable medium of claim 15, wherein the other design elements include foreground design elements and background design elements.

18. The non-transitory computer-readable medium of claim 17, wherein a designation of foreground design elements and background design elements is not visible to the user.

19. The non-transitory computer-readable medium of claim 18, further comprising:

search the database for the selected design element to determine whether the user has access rights to edit the selected design element.

20. The non-transitory computer-readable medium of claim 19, further comprising:

when the user does not have access rights to the selected design element, the system notifies the user of insufficient access.

* * * * *